(12) United States Patent
Dan

(10) Patent No.: US 8,133,628 B2
(45) Date of Patent: Mar. 13, 2012

(54) FUEL CELL SYSTEM

(75) Inventor: Koji Dan, Niiza (JP)

(73) Assignee: Honda Motor Co., Ltd., Tokyo (JP)

( * ) Notice: Subject to any disclaimer, the term of this patent is extended or adjusted under 35 U.S.C. 154(b) by 692 days.

(21) Appl. No.: 12/297,194

(22) PCT Filed: Apr. 11, 2007

(86) PCT No.: PCT/JP2007/058384
§ 371 (c)(1),
(2), (4) Date: Oct. 14, 2008

(87) PCT Pub. No.: WO2007/119862
PCT Pub. Date: Oct. 25, 2007

(65) Prior Publication Data
US 2009/0280370 A1 Nov. 12, 2009

(30) Foreign Application Priority Data
Apr. 14, 2006 (JP) .................... 2006-111988

(51) Int. Cl.
*H01M 8/04* (2006.01)
(52) U.S. Cl. ...................................... 429/435
(58) Field of Classification Search .......... 429/435, 429/440, 441
See application file for complete search history.

(56) References Cited

U.S. PATENT DOCUMENTS

| | | | |
|---|---|---|---|
| 5,998,053 A * | 12/1999 | Diethelm | 429/429 |
| 6,303,243 B1 | 10/2001 | Schuler | |
| 6,838,062 B2 * | 1/2005 | Goebel et al. | 422/198 |
| 2006/0134477 A1 * | 6/2006 | Homma et al. | 429/20 |
| 2006/0188761 A1 * | 8/2006 | O'Brien et al. | 429/19 |

FOREIGN PATENT DOCUMENTS

| | | |
|---|---|---|
| DE | 19606665 A1 | 8/1997 |
| DE | 29820482 | 4/1999 |
| DE | 19852853 A1 | 7/1999 |
| JP | 9-293525 | 11/1997 |
| JP | 2004-179153 | 6/2004 |
| WO | WO-2005/099011 A2 | 10/2005 |

OTHER PUBLICATIONS

International Search Report for Application No. PCT/JP2007/058384, dated Dec. 3, 2007.
Japanese Office Action for Application No. 2006-111988, dated Nov. 15, 2011.

* cited by examiner

*Primary Examiner* — Phuong Dinh
(74) *Attorney, Agent, or Firm* — Nelson Mullins Riley & Scarborough LLP; Anthony A. Laurentano

(57) ABSTRACT

A fuel cell system includes a fuel cell stack, a heat exchanger for heating an oxygen-containing gas using a heat medium before the oxygen-containing gas is supplied to the fuel cell stack, a reformer for reforming a raw fuel chiefly containing hydrocarbon to produce a fuel gas to be supplied to the fuel cell stack, a combustor for burning a raw fuel and an exhaust gas discharged from the fuel cell stack after consumption in power generation reaction to produce a combustion gas, and a heat retention chamber provided to cover opposite ends of the fuel cell stack in the stacking direction. Before an exhaust gas is supplied to the combustor, the exhaust gas flows into the heat retention chamber as a heat source for maintaining the temperature of the fuel cell stack.

14 Claims, 10 Drawing Sheets

FUEL CELL SYSTEM

RELATED APPLICATIONS

This application is a 35 U.S.C. 371 national stage filing of International Application No. PCT/JP2007/058384, filed 11 Apr. 2007, which claims priority to Japanese Patent Application No. 2006-111988 filed on 14 Apr. 2006 in Japan. The contents of the aforementioned applications are hereby incorporated by reference.

TECHNICAL FIELD

The present invention relates to a fuel cell system including a fuel cell stack formed by stacking a plurality of fuel cells. Each of the fuel cells is formed by stacking an electrolyte electrode assembly and a separator. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In practical use, generally, predetermined numbers of the electrolyte electrode assemblies and the separators are stacked together to form a fuel cell stack.

The operating temperature of the fuel cell is high, about 800° C. Therefore, at the time of starting operation of the fuel cell stack, it is desirable to heat the fuel cell stack to a desired temperature rapidly. Normally, the combustor is provided on a side of the fuel cell stack where the oxygen-containing gas is supplied, or on a side of the fuel cell stack where the exhaust gas is discharged.

However, in the structure where the combustor is provided on the side where the oxygen-containing gas is supplied, the hot fuel gas produced by combustion in the combustor directly flows into the fuel cell stack. Therefore, the separators tend to be corroded easily by the hot combustion gas, and carbon in the combustion gas adheres to the separators.

In an attempt to address the problems, structure of providing the combustor on the side of the fuel cell stack where the exhaust gas is discharged may be adopted. For example, Japanese Laid-open Patent Publication No. 2004-179153 discloses a fuel cell system as shown in FIG. 10. The fuel cell system includes a fuel cell 1, hydrogen supply means 2 for supplying hydrogen by circulation, oxygen-containing gas supply means 3 for supplying the air containing oxygen, temperature adjustment means 4 for supplying a heat medium to the fuel cell 1, combustion gas generating means 5 for burning the discharged hydrogen containing purged impurities together with the discharged oxygen, and heat exchange means 6 for performing heat exchange between the combustion gas from the combustion gas generating means 5 and the heat medium.

At the time of starting operation of the fuel cell system at a low temperature, the heat of the combustion gas produced by the combustion gas generating means 5 is supplied to the heat medium for heating the heat medium. The heat medium is used to regulate the temperature of the fuel cell system by the heat exchange means 6, for warming up the fuel cell system. At the time of purging hydrogen, the hot combustion gas produced by the combustion gas generating means 5 is discharged without passing through the heat exchange means 6.

In the fuel cell system, typically, a plurality of the fuel cells 1 are stacked together to form a fuel cell stack. In the structure, heat tends to be radiated from ends of the fuel cell stack in the stacking direction, and temperature becomes non-uniform along the stacking direction of the fuel cell stack. Thus, the temperature of the fuel cell stack is lowered, and power generation efficiency is lowered undesirably.

DISCLOSURE OF INVENTION

The present invention solves the above problems, and an object of the present invention is to provide a fuel cell system having simple structure in which uniform temperature in a stacking direction is achieved, and heat efficiency is improved.

The present invention relates to a fuel cell system including a fuel cell stack, a heat exchanger, a reformer, a combustor, and a heat retention chamber. The fuel cell stack is formed by stacking a plurality of fuel cells. Each of the fuel cells is formed by stacking an electrolyte electrode assembly and a separator. The electrolyte electrode assembly includes an anode, a cathode, and an electrolyte interposed between the anode and the cathode. The heat exchanger heats an oxygen-containing gas using a heat medium before the oxygen-containing gas is supplied to the fuel cell stack. A reformer reforms a raw fuel chiefly containing hydrocarbon to produce a fuel gas to be supplied to the fuel cell stack. The combustor burns a raw fuel and an exhaust gas discharged from the fuel cell stack after consumption in power generation reaction to produce a combustion gas as the heat medium. The heat retention chamber is provided to cover opposite ends of the fuel cell in the stacking direction for introducing the exhaust gas before the exhaust gas is supplied to the combustor as a heat source for maintaining the temperature of the fuel cell stack.

After the fuel gas is supplied to the anode for power generation reaction, when the fuel gas is discharged from the anode as an exhaust gas, the exhaust gas contains the unconsumed gas. The exhaust gas containing the unconsumed gas is referred to as the off gas.

According to the present invention, the exhaust gas discharged from the fuel cell stack after consumption in the power generation reaction has a considerably high temperature. The hot exhaust gas flows into the heat retention chamber provided to cover the opposite ends of the fuel cell in the stacking direction. Therefore, heat radiation from the opposite ends of the fuel cell stack in the stacking direction is reduced significantly, and the uniform temperature distribution in the stacking direction of the fuel cell stack is achieved. Thus, with simple structure, the temperature of the fuel cell stack is not lowered, and heat efficiency is improved advantageously.

Further, the off gas discharged from the fuel cell stack is supplied from the heat retention chamber to the combustor. In the structure, the unburned fuel gas in the off gas can be utilized in combustion, and further improvement in heat efficiency is achieved. Since the unburned fuel gas is not discharged, dedicated processing equipment for processing the unburned fuel gas is not required, and cost reduction is achieved.

BEST MODE FOR CARRYING OUT THE INVENTION

Figure 1:
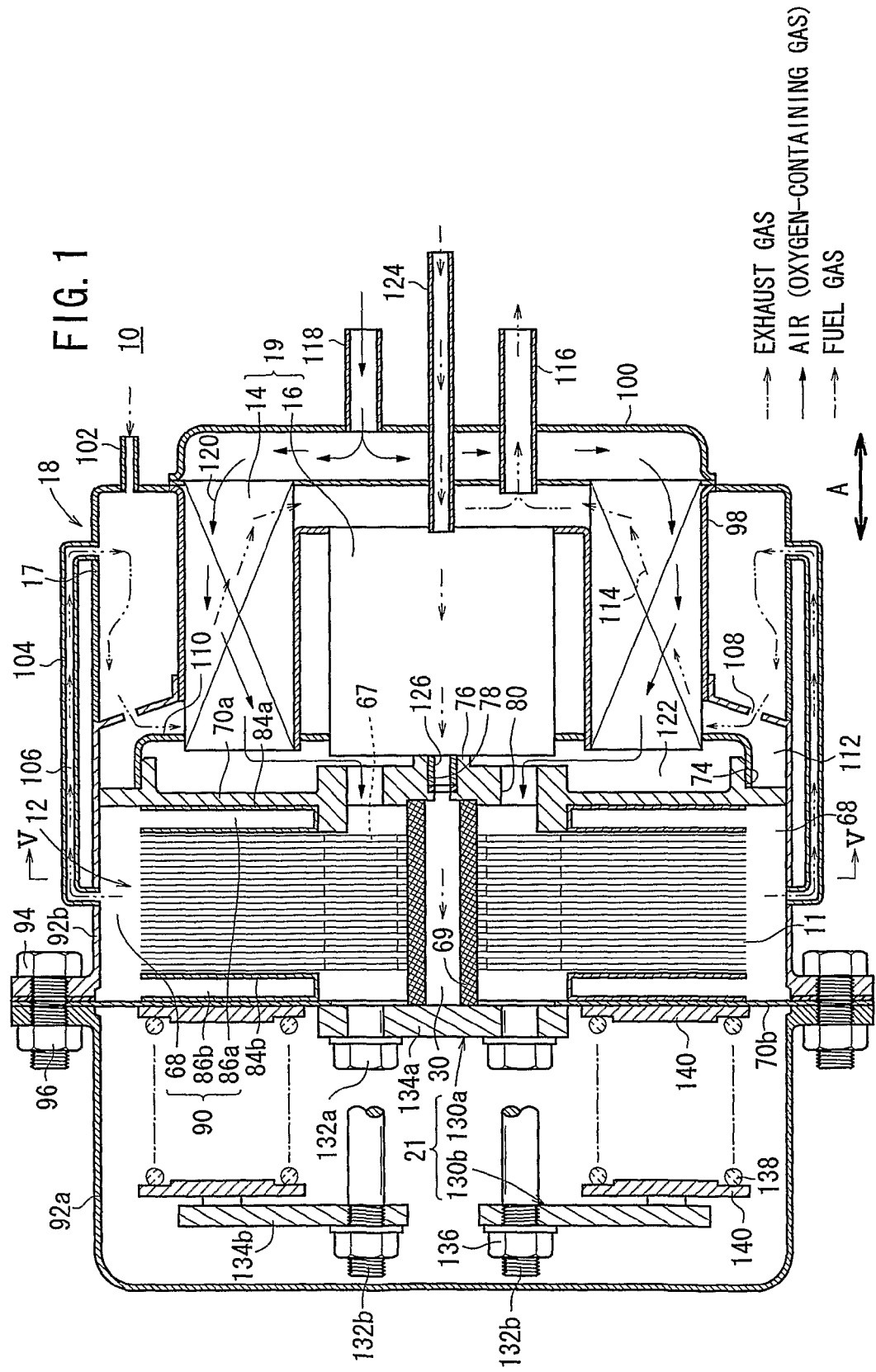
FIG. 1 is a partial cross sectional view showing a fuel cell system according to a first embodiment of the present invention.
Figure 2:
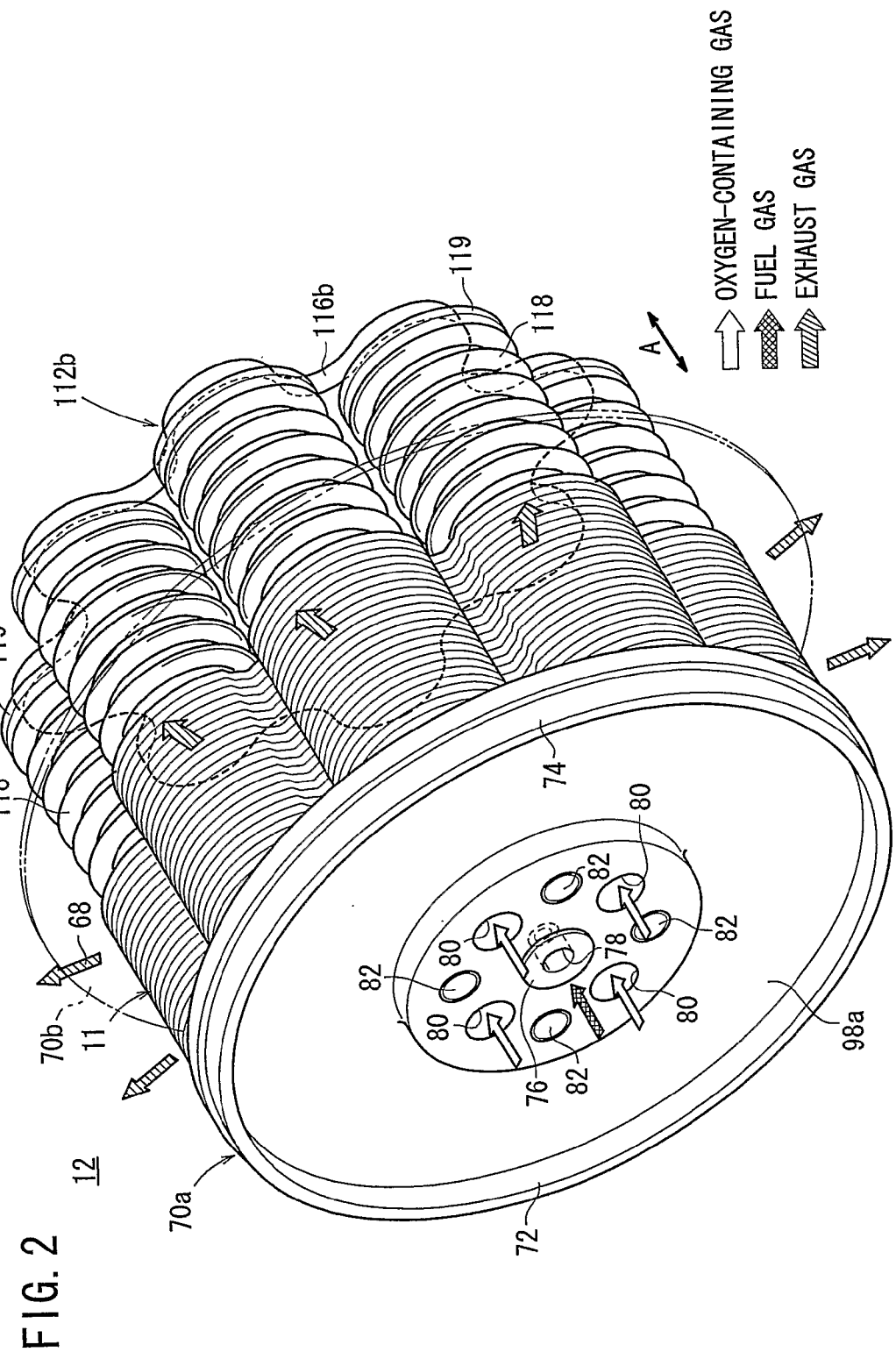
FIG. 2 is a perspective view schematically showing a fuel cell stack of the fuel cell system.

FIG. 1 is a partial cross sectional view showing a fuel cell system 10 according to the first embodiment of the present invention. FIG. 2 is a perspective view schematically showing a fuel cell stack 12 of the fuel cell system 10. The fuel cell stack 12 is formed by stacking a plurality of fuel cells 11 in a direction indicated by an arrow A.

The fuel cell system 10 is used in various applications, including stationary and mobile applications. For example, the fuel cell system 10 is mounted on a vehicle. As shown in FIG. 1, the fuel cell system 10 includes the fuel cell stack 12, a heat exchanger 14, a reformer 16, a combustor 17, and a casing 18. The heat exchanger 14 heats an oxygen-containing gas before it is supplied to the fuel cell stack 12. The reformer 16 reforms a raw fuel chiefly containing hydrocarbon to produce a fuel gas. The combustor 17 burns the raw fuel and exhaust gas to produce a combustion gas. The exhaust gas is discharged from the fuel cell stack 12 after consumption in the power generation. The fuel cell stack 12, the heat exchanger 14, and the reformer 16 are disposed in the casing 18.

In the casing 18, a fluid unit 19 including at least the heat exchanger 14 and the reformer 16 is disposed on one side of the fuel cell stack 12, and a load applying mechanism 21 for applying a tightening load to the fuel cells 11 in the stacking direction indicated by the arrow A is disposed on the other side of the fuel cell stack 12. The fluid unit 19 and the load applying mechanism 21 are provided symmetrically with respect to the central axis of the fuel cell stack 12.

Figure 3:
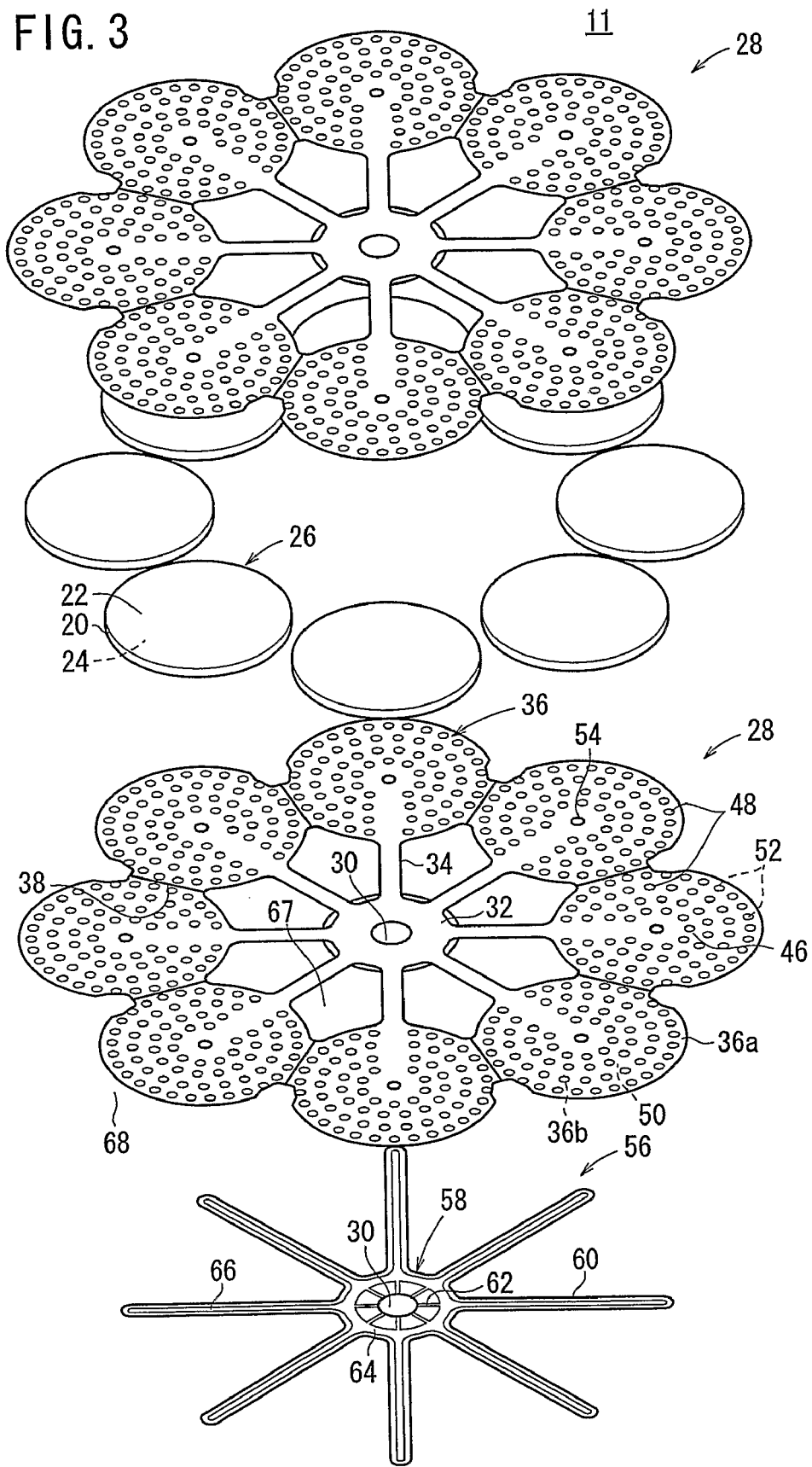
FIG. 3 is an exploded perspective view showing a fuel cell of the fuel cell stack.

The fuel cell 11 is a solid oxide fuel cell (SOFC). As shown in FIG. 3, the fuel cell 11 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 is a plate having a circular disk shape. A barrier layer (not shown) is provided at least at the inner circumferential edge of the electrolyte electrode assembly 26 (center of the separator 28) for preventing the entry of the oxygen-containing gas.

A plurality of, e.g., eight electrolyte electrode assemblies 26 are sandwiched between a pair of separators 28 to form the fuel cell 11. The eight electrolyte electrode assemblies 26 are aligned along a virtual circle concentric with a fuel gas supply passage 30 extending through the center of the separators 28.

For example, each of the separators 28 comprises a single metal plate of, e.g., stainless alloy or a carbon plate. The separator 28 has a first small diameter end portion 32. The fuel gas supply passage 30 extends through the center of the first small diameter end portion 32. The first small diameter end portion 32 is integral with circular disks 36 each having a relatively large diameter through a plurality of first bridges 34. The first bridges 34 extend radially outwardly from the first small diameter end portion 32 at equal angles (intervals). The circular disk 36 and the electrolyte electrode assembly 26 have substantially the same size. The adjacent circular disks 36 are separated by a slit 38.

Each of the circular disks 36 has first protrusions 48 on its surface 36a which contacts the anode 24. The first protrusions 48 form a fuel gas channel 46 for supplying the fuel gas along an electrode surface of the anode 24. Each of the circular disks 36 has second protrusions 52 on its surface 36b which contacts the cathode 22. The second protrusions 52 form an oxygen-containing gas channel 50 for supplying the oxygen-containing gas along an electrode surface of the cathode 22.

Figure 4:
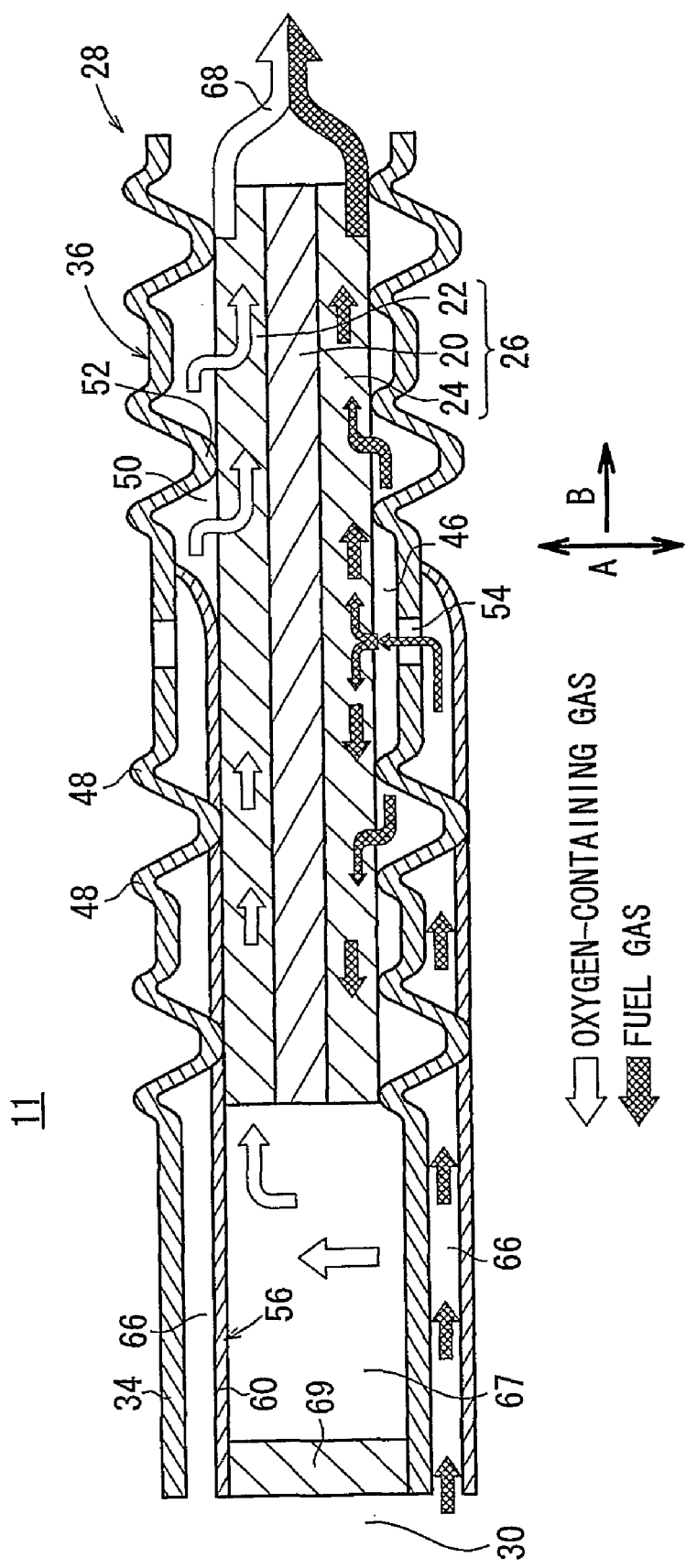
FIG. 4 is a cross sectional view schematically showing operation of the fuel cell.

As shown in FIG. 4, the first and second protrusions 48, 52 protrude in opposite directions. The first protrusions 48 are ring shaped protrusions, and the second protrusions 52 are mountain shaped protrusions. The second protrusions (mountain shaped protrusions) 52 are surrounded by the first protrusions (ring shaped protrusions) 48.

As shown in FIGS. 3 to 4, a fuel gas inlet 54 is provided in each of the circular disks 36 for supplying the fuel gas to the fuel gas channel 46. The position of the fuel gas inlet 54 is determined such that uniform distribution of the fuel gas is achieved. For example, the fuel gas inlet 54 is positioned at substantially the center of the circular disk 36.

A channel member 56 is fixed to the separator 28 by brazing or laser welding on a surface facing the cathode 22. As shown in FIG. 3, the channel member 56 includes a second small diameter end portion 58. The fuel gas supply passage 30 extends through the center of the second small diameter end portion 58. Eight second bridges 60 extend radially from the second small diameter end portion 58. Each of the second bridges 60 is fixed to the separator 28, from the first bridge 34 to the fuel gas inlet 54 of the circular disk 36.

A plurality of slits 62 are formed on the second small diameter end portion 58 of the channel member 56. The slits 62 are formed radially on a surface of the second small diameter end portion 58 which is joined to the separator 28. The slits 62 are connected to the fuel gas supply passage 30. Further, the slits 62 are connected to a recess 64 formed in the outer circumferential region of the second small diameter end portion 58. A fuel gas supply channel 66 is formed between the first and second bridges 34, 60. The fuel gas supply channel 66 is connected to the fuel gas channel 46 via the slits 62 and the recess 64 through the fuel gas inlet 54.

As shown in FIG. 4, the oxygen-containing gas channel 50 is connected to an oxygen-containing gas supply unit 67. The oxygen-containing gas is supplied in the direction indicated by the arrow B through the space between the inner circumferential edge of the electrolyte electrode assembly 26 and the inner circumferential edge of the circular disk 36. The oxygen-containing gas supply unit 67 extends in the stacking direction inside the circular disks 36 between the first bridges 34.

An insulating seal 69 for sealing the fuel gas supply passage 30 is provided between a pair of the separators 28. For example, the insulating seal 69 is made of mica material, or ceramic material. An exhaust gas channel 68 is formed, around the circular disks 36 of the fuel cells 11.

As shown in FIGS. 1 and 2, the fuel cell stack 12 includes a plurality of the fuel cells 11 stacked together, and end plates 70a, 70b provided at opposite ends in the stacking direction. Each of the end plates 70a, 70b has a substantially circular disk shape. A ring shaped portion 72 protrudes from the outer circumferential end of the end plate 70a, and a groove 74 is formed around the ring shaped portion 72. A columnar projection 76 is formed at the center of the ring shaped portion 72. The columnar projection 76 protrudes in the same direction as the ring shaped portion 72. A stepped hole 78 is formed at the center of the projection 76.

Holes 80 and screw holes 82 are formed on a same virtual circle around the projection 76. The holes 80 and the screw holes 82 are arranged alternately, and spaced at predetermined angles (intervals). The diameter of the end plate 70b is larger than the diameter of the end plate 70a. The end plate 70a is an electrically conductive thin plate.

Spacer members 84a, 84b are provided between the outermost fuel cells 11 at opposite ends in the stacking direction and the end plates 70a, 70b. Each of the spacer members 84a, 84b has a substantially circular disk shape, and is cut away radially inwardly from its outer circumferential portion. That is, ring shaped chambers 86a, 86b are formed to cover the outermost fuel cells 11 at opposite ends in the stacking direction.

The exhaust gas channel 68 is provided between the outer ends of the stacked fuel cells 11 and the inner wall of the casing 18. The chambers 86a, 86b and the exhaust gas channel 68 form a heat retention chamber 90. The heat retention chamber 90 is closed by the end plates 70a, 70b, and the inner wall of the casing 18. The heat retention chamber 90 is connected to an exhaust gas path 106 as described later. The heat retention chamber 90 is symmetrical with respect to the central axis of the fuel cell stack 12, and symmetrical from the center of the fuel cell stack 12 toward one end and the other end in the stacking direction. In the structure, heat radiation from the fuel cell stack 12 is prevented. Further, the uniform temperature distribution is achieved, and heat distortion or the like does not occur in the fuel cell stack 12.

The casing 18 includes a first case unit 92a containing the load applying mechanism 21 and a second case unit 92b containing the fuel cell stack 12. The end plate 70b and an insulating member are sandwiched between the first case unit 92a and the second case unit 92b. The insulating member is provided on the side of the second case unit 92b. The joint portion between the first case unit 92a and the second case unit 92b is tightened by screws 94 and nuts 96.

An end of a ring shaped wall plate 98 is joined to the second case unit 92b, and a head plate 100 is fixed to the other end of the wall plate 98. The fluid unit 19 is provided symmetrically with respect to the central axis of the fuel cell stack 12. Specifically, the substantially cylindrical reformer 16 is provided coaxially inside the substantially ring shaped heat exchanger 14.

Figure 5:
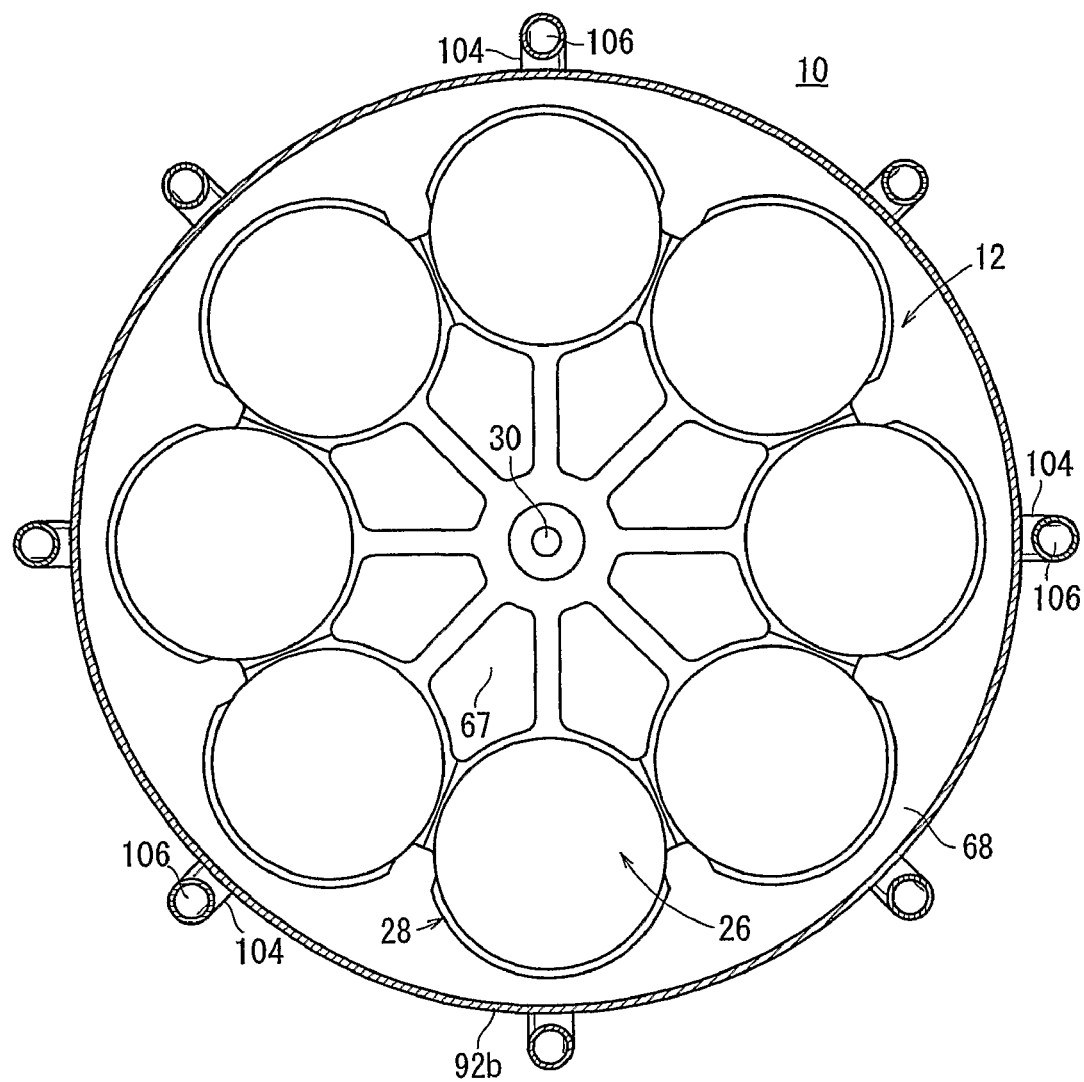
FIG. 5 is a cross sectional view showing the fuel cell stack taken along a line V-V in FIG. 1.

The combustor 17 is provided around the outer circumferential portion of the wall plate 98. The combustor 17 is formed integrally with, or separately from the casing 18. A raw fuel supply pipe 102 for supplying a raw fuel is connected to the combustor 17. A plurality of exhaust gas pipes 104 are connected to the outer circumferential portion of the combustor 17 and the outer circumferential portion of the second case unit 92b. As shown in FIG. 5, the positions and the number of the pipes 104 correspond to the positions and the number of the electrolyte electrode assemblies 26. In practice, eight pipes 104 are provided at predetermined angles (intervals). The exhaust gas path 106 is formed inside the pipes 104. The exhaust gas path 106 connects the substantially central portions of the heat retention chamber 90 and the combustor 17 (see FIG. 1). That is, the exhaust gas path 106 has an exhaust gas inlet at a position corresponding to the substantial center of the fuel cell stack 12. In the structure, temperature distribution does not tend to be non-uniform in the fuel cell stack 12 by the exhaust gas, and the exhaust gas is discharged efficiently.

At a front end of the second case unit 92b, a hole 108 connected to the combustor 17 is formed. A wall plate 110 is fixed to the end plate 70a and the heat exchanger 14. A combustion gas chamber 112 is formed between the wall plate 110 and the second case unit 92b. The combustion gas chamber 112 is connected to the inside of the combustor 17 through the hole 108. The combustion gas chamber 112 is connected to a channel 114 in the heat exchanger 14. The channel 114 is connected to the exhaust gas pipe 116 connected to the head plate 100.

An air supply pipe 118 is connected to the head plate 100. The air supply pipe 118 is connected to a chamber 122 formed inside the wall plate 110 through the channel 120. The chamber 122 is connected to the oxygen-containing gas supply unit 67 in the fuel cell stack 12 through the hole 80 of the end plate 70a.

A fuel gas supply pipe 124 and a reformed gas supply pipe 126 are connected to the reformer 16. The fuel gas supply pipe 124 extends to the outside from the head plate 100. The reformed gas supply pipe 126 is inserted into a stepped hole 78 of the end plate 70a, and connected to the fuel gas supply passage 30.

The load applying mechanism 21 includes a first tightening unit 130a for applying a first tightening load T1 to a region around (near) the fuel gas supply passage 30 and a second tightening unit 130b for applying a second tightening load T2 to the electrolyte electrode assemblies 26. The second tightening load T2 is smaller than the first tightening load T1 (T1>T2).

The first tightening unit 130a includes short first tightening bolts 132a screwed into screw holes 82 formed along one diagonal line of the end plate 70a. The first tightening bolts 132a extend in the stacking direction of the fuel cells 11, and engage a first presser plate 134a. The first tightening bolts 132a are provided in the oxygen-containing gas supply unit 67 extending through the separators 28. The first presser plate 134a is a narrow plate, and engages the central position of the separator 28 to cover the fuel gas supply passage 30.

The second tightening unit 130b includes long second tightening bolts 132b screwed into screw holes 82 formed along the other diagonal line of the end plate 70a. Ends of the second tightening bolts 132b extend through a second presser plate 134b having a curved outer section. Nuts 136 are fitted to the ends of the second tightening bolts 132b. The second tightening bolts 132b are provided in the oxygen-containing gas supply unit 67 extending through the separators 28. Springs 138 and spring seats 140 are provided in respective circular portions of the second presser plate 134b, at positions corresponding to the electrolyte electrode assemblies 26 on the circular disks 36 of the fuel cell 11. For example, the springs 138 are ceramics springs.

Operation of the fuel cell system 10 will be described below.

As shown in FIG. 1, a raw fuel (methane, ethane, propane, or the like) and, as necessary, water are supplied from the fuel gas supply pipe 124, and an oxygen-containing gas (hereinafter referred to as the "air") is supplied from the air supply pipe 118.

The raw fuel is reformed when it passes through the reformer 16 to produce a fuel gas (hydrogen-containing gas). The fuel gas is supplied to the fuel gas supply passage 30 of the fuel cell stack 12. The fuel gas moves in the stacking direction indicated by the arrow A, and flows into the fuel gas supply channel 66 of each fuel cell 11 (FIG. 4).

The fuel gas flows along the fuel gas supply channel 66 between the first and second bridges 34, 60, and flows into the fuel gas channels 46 from the fuel gas inlets 54 of the circular disks 36. The fuel gas inlets 54 are formed at substantially the central positions of the anodes 24 of the electrolyte electrode assemblies 26. Thus, in each of the electrolyte electrode assemblies 26, the fuel gas is supplied from the fuel gas inlet 54 to the substantially the central position of the anode 24, and flows outwardly toward the outer end of the anode 24 along the fuel gas channel 46.

As shown in FIG. 1, the air from the air supply pipe 118 flows through the channel 120, and temporarily flows into the chamber 122. The air flows through the hole 80 connected to the chamber 122, and is supplied to the oxygen-containing gas supply unit 67 provided inside the fuel cells 11 (provided at the substantial center of the separators 28). At this time, in the heat exchanger 14, as described later, the exhaust gas discharged to the exhaust gas channel 68 flows through the channel 114. The exhaust gas is heated by the combustor 17, and supplied as a hot combustion gas. Thus, heat exchange between the exhaust gas and the air before consumption is performed, i.e., the air is heated to a predetermined fuel cell operating temperature before it is supplied to the fuel cells 11.

The oxygen-containing gas supplied to the oxygen-containing gas supply unit 67 flows into the space between the inner circumferential edge of the electrolyte electrode assembly 26 and the inner circumferential edge of the circular disk 36 in the direction indicated by the arrow B, and flows toward the oxygen-containing gas channel 50. As shown in FIG. 4, in the oxygen-containing gas channel 50, the oxygen-containing gas flows from the inner circumferential edge (central region of the separator 28) to the other outer circumferential edge (outer circumferential region of the separator 28) of, i.e., from one end to the other end of the cathode 22 of the electrolyte electrode assembly 26.

Thus, in the electrolyte electrode assembly 26, the fuel gas flows from the center to the outer circumferential side on the electrode surface of the anode 24, and the oxygen-containing gas flows in one direction indicated by the arrow B on the electrode surface of the cathode 22. At this time, oxygen ions flow through the electrolyte 20 toward the anode 24 for generating electricity by electrochemical reactions.

In the first embodiment, the exhaust gas channel 68 provided around the fuel cell stack 12 is connected to the chambers 86a, 86b provided to cover the opposite ends of the fuel cell stack 12 in the stacking direction. The chambers 86a, 86b form the heat retention chamber 90. In the structure, significantly hot exhaust gas is discharged from the outer circumferential portion of the fuel cell stack 12 after consumption in the power generation reaction in the fuel cell stack 12, and the exhaust gas flows into the chambers 86a, 86b.

Thus, heat radiation from the opposite ends of the fuel cell stack 12 in the stacking direction is reduced, and it is possible to effectively achieve the uniform temperature in the stacking direction of the fuel cell stack 12. With the simple structure, it is possible to prevent the temperature of the fuel cell stack 12 from being lowered, and power generation efficiency in each of the fuel cells 11 is improved advantageously.

The exhaust gas which has been supplied into the heat retention chamber 90 including the chambers 86a, 86b flows through each exhaust gas path 106 connected to the heat retention chamber 90, and the exhaust gas is supplied into the combustor 17. Thus, the unburned fuel gas in the exhaust gas (off gas) is used in combustion in the combustor 17, and improvement in heat efficiency is achieved. Further, since the unburned fuel gas is not directly discharged to the outside, no dedicated processing equipment for processing the unburned fuel gas is required, and cost reduction is achieved.

At the time of starting operation of the fuel cell stack 12, the raw fuel is supplied to the combustor 17 through the raw fuel supply pipe 102 for combustion. The combustion gas produced by combustion in the combustor 17 flows from the hole 108, and flows through the combustion gas chamber 112 into the channel 114 of the heat exchanger 14. At this time, the combustion gas which has been supplied into the channel 114 is burned using a burner or the like in the combustor 17. Thus, the temperature of the combustion gas becomes considerably high. The hot combustion gas is used for heating the air supplied along the channel 120 efficiently. Thus, the fuel cell stack 12 is heated by the hot air which has been heated in the heat exchange at the heat exchanger 14. Thus, it is possible to suitably start operation of the fuel cell stack 12.

Further, as shown in FIG. 5, the number of pipes 104 is eight, corresponding to the eight electrolyte electrode assemblies 26. Thus, the exhaust gas discharged to the exhaust gas channel 68 around the respective electrolyte electrode assemblies 26 is supplied smoothly to the combustor 17 through the exhaust gas path 106 in each of the pipes 104. Further, since the exhaust gas is supplied to the combustor 17 through the eight pipes 104, the uniform temperature in the area around the combustor 17 is achieved.

Figure 6:
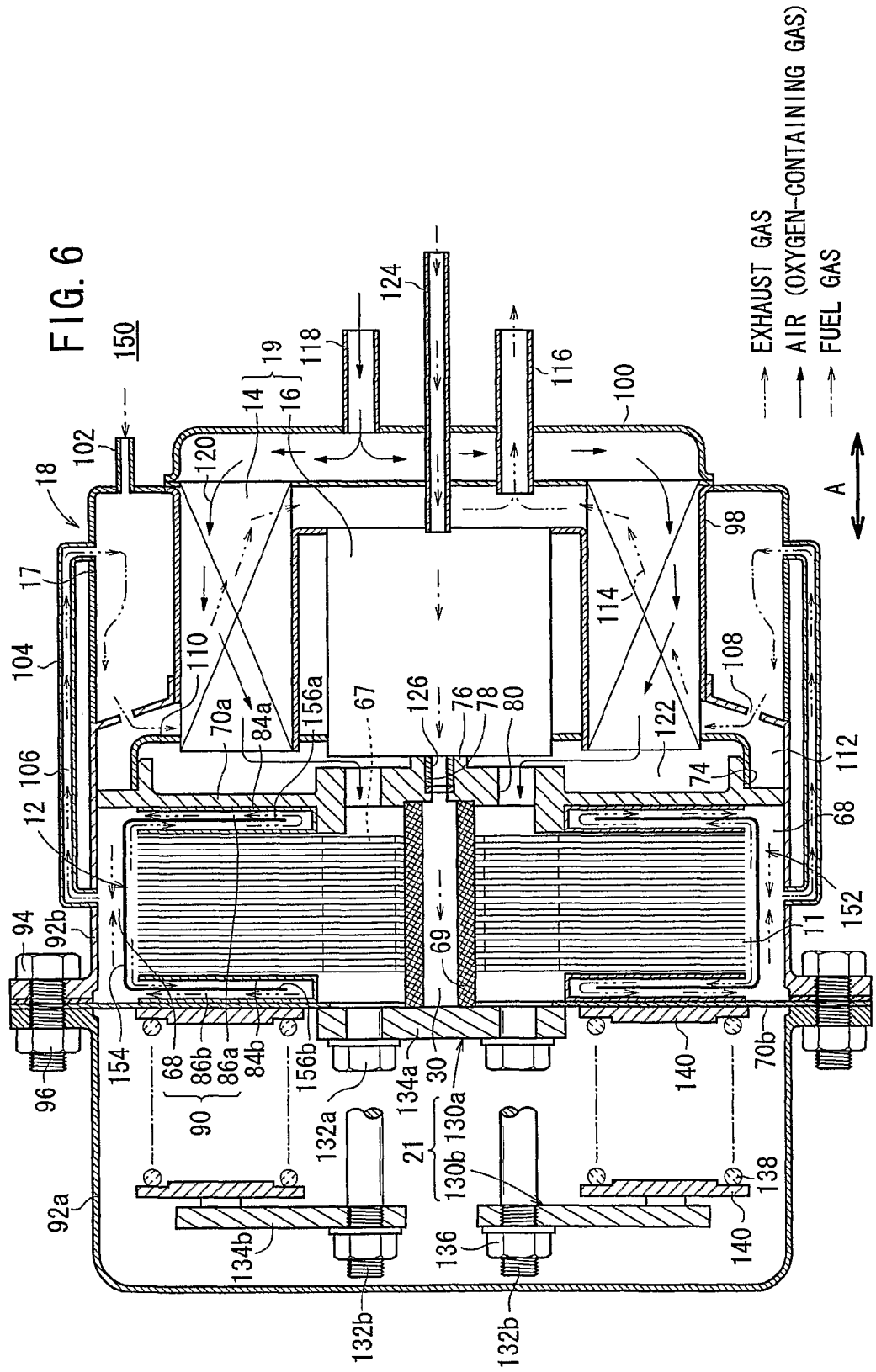
FIG. 6 is a partial cross sectional view showing a fuel cell system according to a second embodiment of the present invention.

FIG. 6 is a partial cross sectional view showing a fuel cell system 150 according to a second embodiment of the present invention. The constituent elements that are identical to those of the fuel cell system 10 according to the first embodiment are labeled with the same reference numeral, and description thereof will be omitted. Also in third to fifth embodiments as described later, the constituent elements that are identical to those of the fuel cell system 10 according to the first embodiment are labeled with the same reference numeral, and description thereof will be omitted.

In the fuel cell system 150, a rectifier plate 152 is provided in the heat retention chamber 90. The rectifier plate 152 includes a cylindrical portion 154 extending in the stacking direction of the fuel cell stack 12 indicated by the arrow A, and ring shaped portions 156a, 156b extending up to predetermined positions in the chambers 86a, 86b of the spacer members 84a, 84b. The rectifier plate 152 is symmetrical from the center to one end and the other end in the stacking direction of the fuel cell stack 12. Therefore, heat distortion due to the non-uniform temperature distribution in the rectifier plate 152 does not occur significantly. Accordingly, heat distortion in the fuel cell stack 12 can be prevented advantageously.

In the second embodiment, the exhaust gas discharged from the outer circumferential portion of the fuel cell stack 12 after consumption in the power generation reaction flows separately toward both ends in the stacking direction, along an inner surface of the cylindrical portion 154 of the rectifier plate 152, and is forcibly supplied into the chambers 86a, 86b by the guidance of the ring shaped portions 156a, 156b.

The exhaust gas flows backward from the front ends of the ring shaped portions 156a, 156b, and moves radially outwardly along the chambers 86a, 86b. Then, the exhaust gas flows outside the ring shaped portions 156a, 156b to the exhaust gas path 106 in each pipe 104 through the space outer circumference of the cylindrical portion 154.

Thus, the exhaust gas discharged from the fuel cell stack 12 is supplied smoothly and reliably into the chambers 86a, 86b formed at the opposite ends in the stacking direction according to the guidance of the rectifier plate 152. Accordingly, it is possible to reliably prevent the temperature at the opposite ends of the fuel cell stack 12 in the stacking direction from being lowered. With the simple structure, the same advantages as in the case of the first embodiment can be obtained. For example, efficient power generation is achieved.

Figure 7:
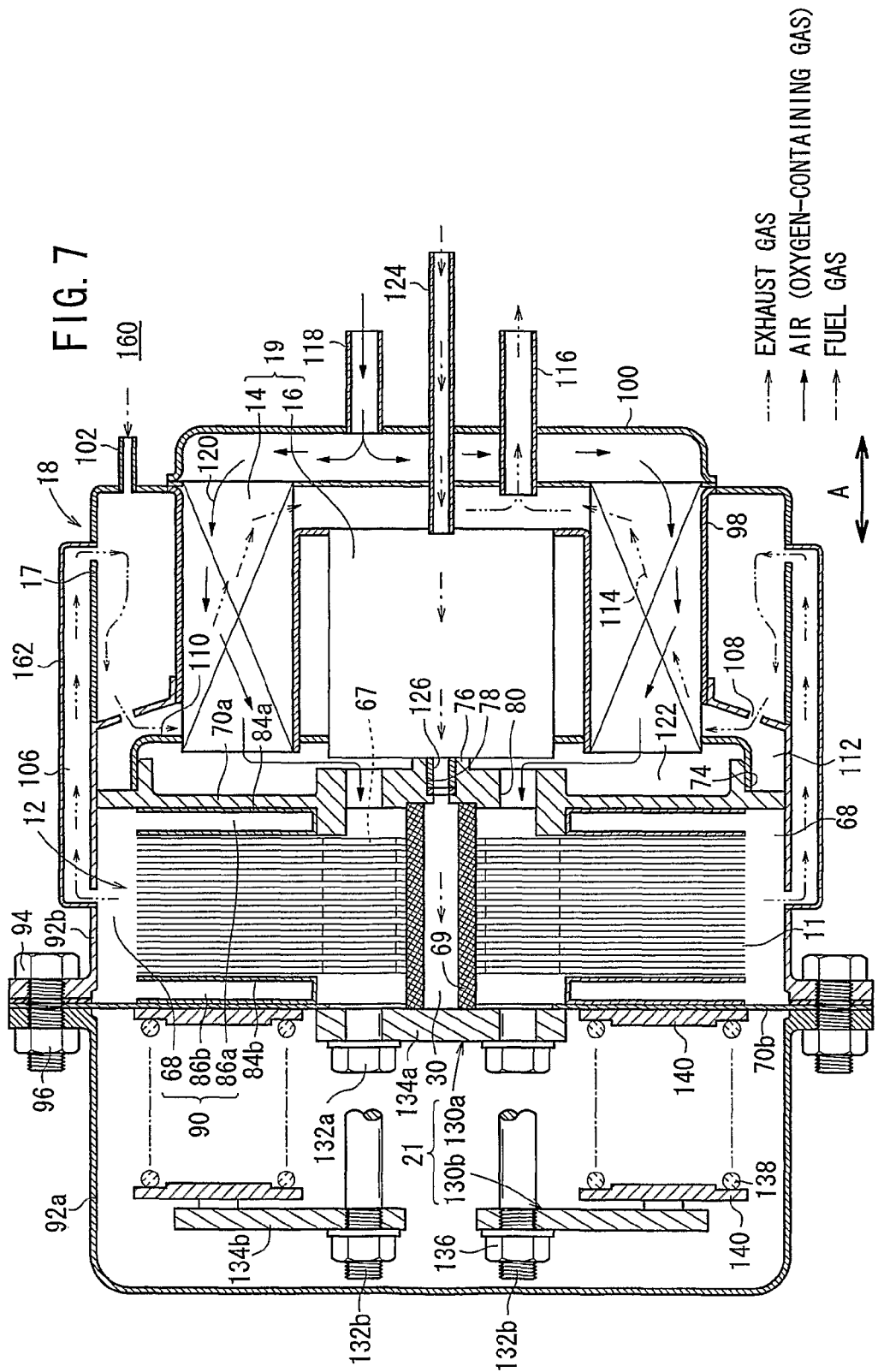
FIG. 7 is a partial cross sectional view showing a fuel cell system according to a third embodiment of the present invention.

FIG. 7 is a cross sectional view showing a fuel cell system 160 according to a third embodiment of the present invention.

The fuel cell system 160 has a dual wall section 162 around the combustor 17 from the position of the second case unit 92b. An exhaust gas path 106 is formed in the dual wall section 162. The exhaust gas path 106 is connected to the heat retention chamber 90 and the combustor 17. In effect, the dual wall section 162 has a cylindrical shape formed around the cylindrical second case unit 92b and the cylindrical combustor 17.

In the third embodiment, the dual wall section 162 is formed around the second case unit 92b and the combustor 17. The exhaust gas having a relatively high temperature is supplied into the exhaust gas path 106 formed in the dual wall section 162. In the structure, further improvement in heat insulation performance in the exhaust gas path 106 is achieved.

Figure 8:
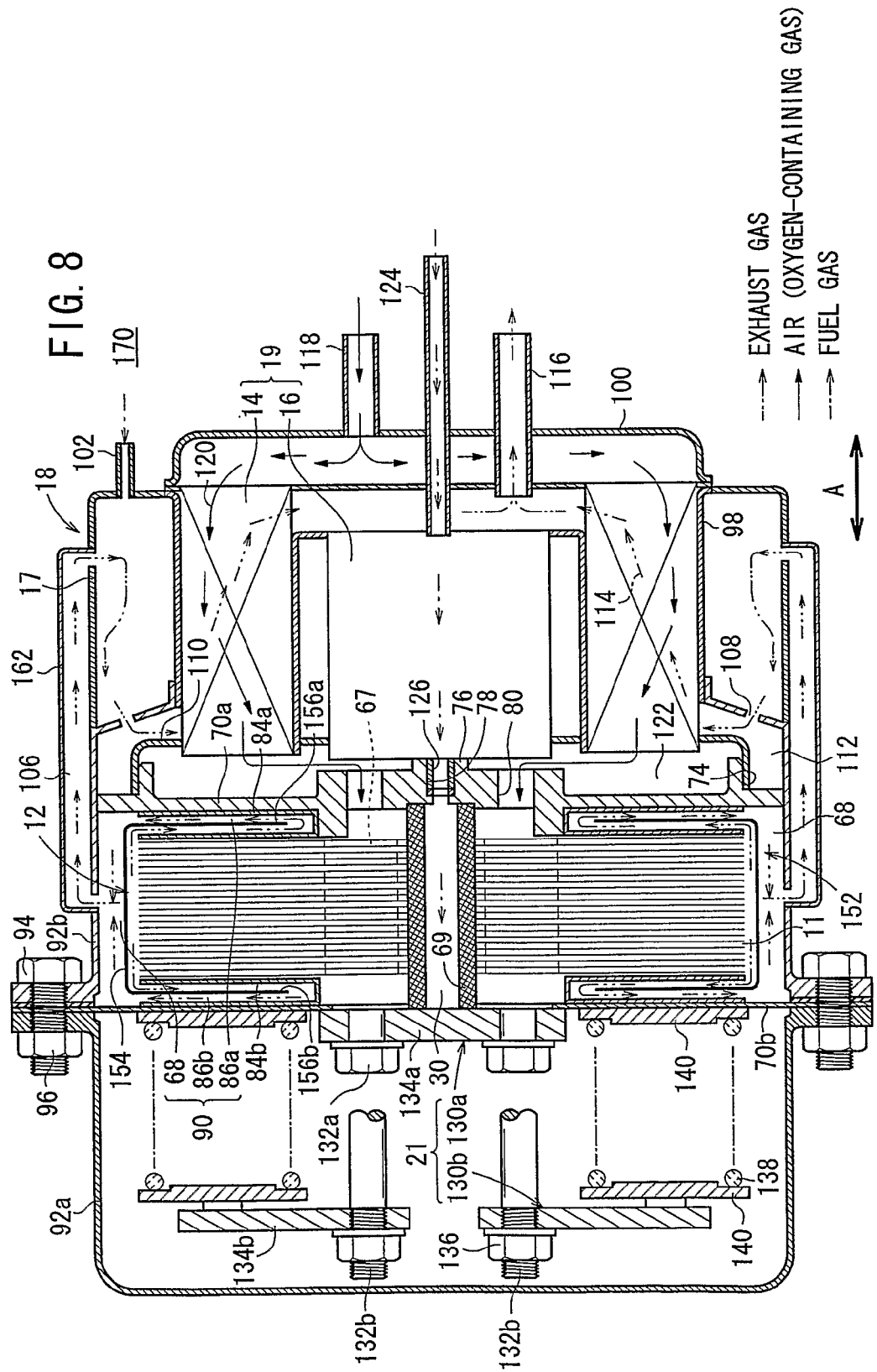
FIG. 8 is a partial cross sectional view showing a fuel cell system according to a fourth embodiment of the present invention.

FIG. 8 is a partial cross sectional view showing a fuel cell system 170 according to a fourth embodiment of the present invention. The constituent elements that are identical to those of the fuel cell system 150 according to the second embodiment and the fuel cell system 160 according to the third embodiment are labeled with the same reference numeral, and description thereof will be omitted.

The fuel cell system 170 has the dual wall section 162, and the rectifier plate 152 is disposed in the heat retention chamber 90.

In the fourth embodiment, the same advantages as in the cases of the first to third embodiments can be achieved. For example, by the guidance of the rectifier plate 152, the exhaust gas is smoothly and reliably supplied to the opposite ends of the fuel cell stack 12 in the stacking direction, and improvement in the heat insulating performance in the exhaust gas path 106 is achieved.

Figure 9:
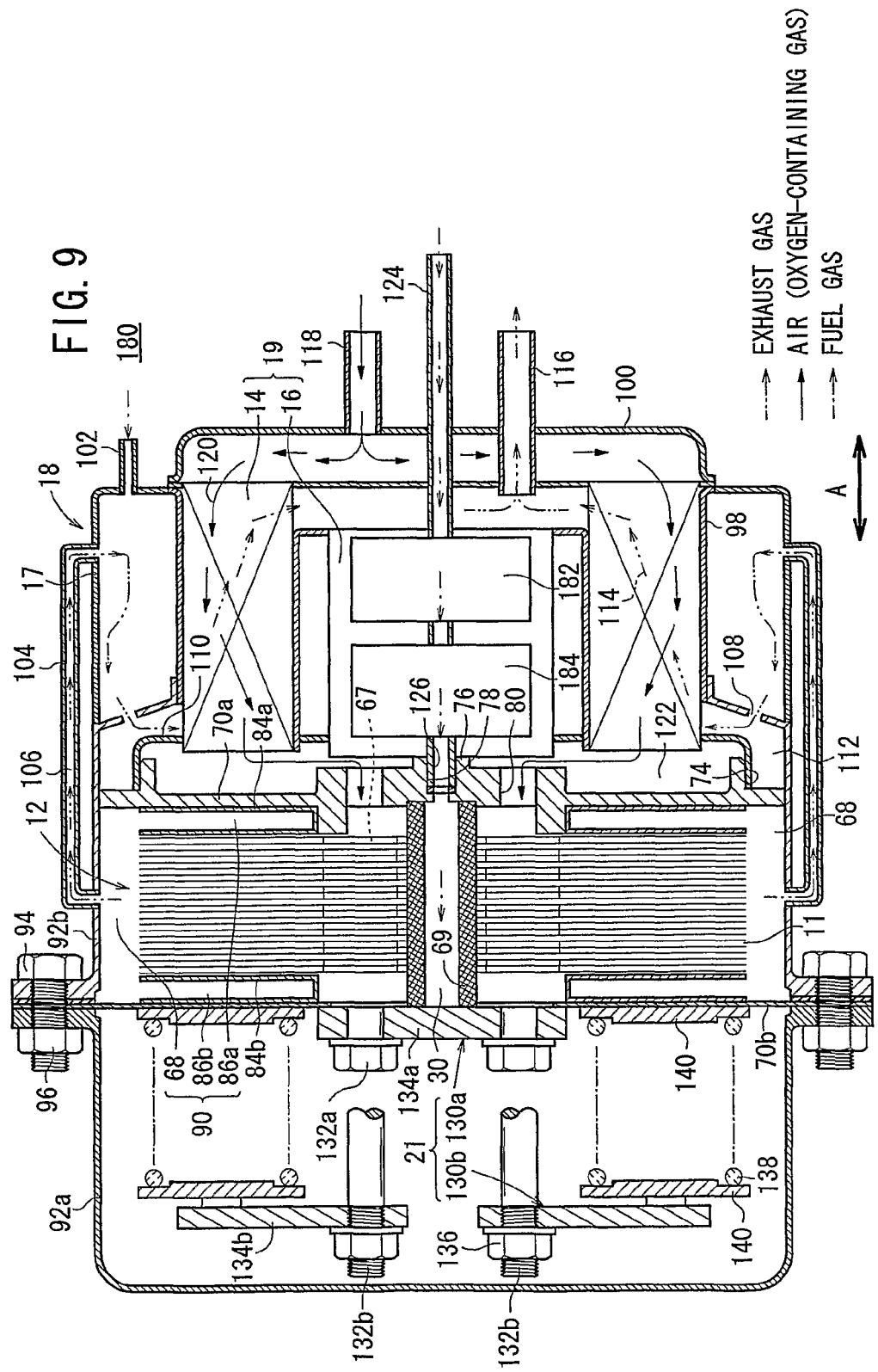
FIG. 9 is a partial cross sectional view showing a fuel cell system according to a fifth embodiment of the present invention.
Figure 10:
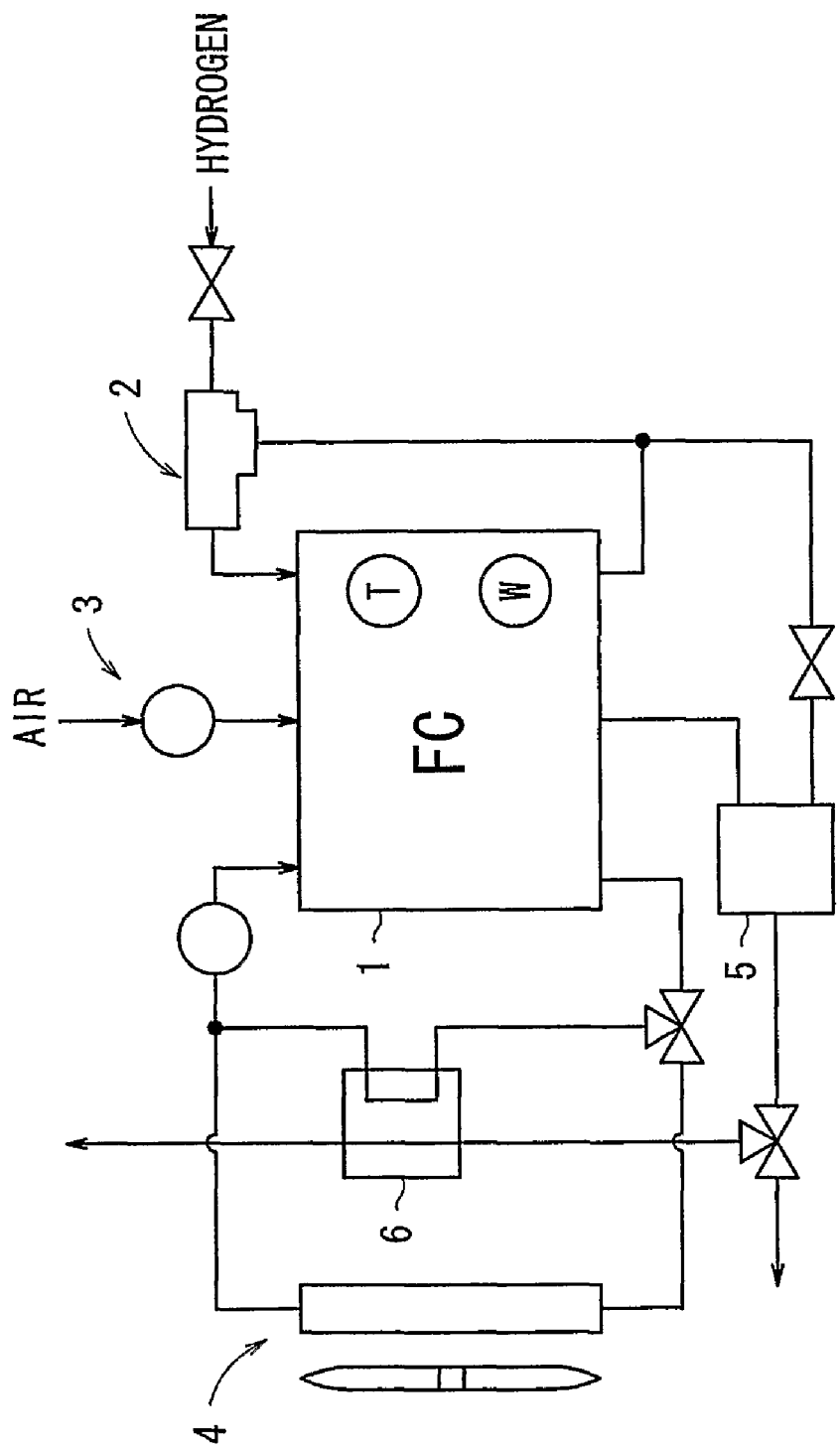
FIG. 10 is a diagram schematically showing a conventional fuel cell system.

FIG. 9 is a partial cross sectional view showing a fuel cell system 180 according to a fifth embodiment of the present invention.

In the fuel cell system 180, an evaporator 182 for evaporating water and a reformer (preliminary reformer) 184 using the water vapor (steam) and a raw fuel (e.g., city gas) for steam reforming of the raw fuel are provided adjacent to each other at the center of the second case unit 92b.

In the fifth embodiment, since the evaporator 182 and the reformer 184 each having a relatively high temperature are provided adjacent to each other, heat is retained reliably, and improvement in heat efficiency is achieved. Further, the same advantages as in the case of the first embodiment can be achieved.

The invention claimed is:

1. A fuel cell system comprising:
a fuel cell stack formed by stacking a plurality of fuel cells, said fuel cells each being formed by stacking an electrolyte electrode assembly and a separator, said electrolyte electrode assembly including an anode, a cathode, and an electrolyte interposed between said anode and said cathode;
a heat exchanger for heating an oxygen-containing gas using a heat medium before the oxygen-containing gas is supplied to said fuel cell stack;
a reformer for reforming a raw fuel chiefly containing hydrocarbon to produce a fuel gas to be supplied to said fuel cell stack;
a combustor for burning a raw fuel and an exhaust gas discharged from said fuel cell stack after consumption in power generation reaction to produce a combustion gas as the heat medium;
a heat retention chamber provided to cover opposite ends of said fuel cell in the stacking direction for accommodating the exhaust gas as a heat source for maintaining a temperature of said fuel cell stack, before the exhaust gas is supplied to said combustor, and
a casing at least containing said fuel cell stack, said heat exchanger, and said reformer, wherein:
said casing includes a fluid unit at least including said heat exchanger and said reformer at one end of said fuel cell stack in the stacking direction, and said heat retention chamber is formed in said casing; and
said heat retention chamber and said combustor are connected through an exhaust gas path.

2. A fuel cell system according to claim 1, wherein said exhaust gas path is provided in each of a plurality of pipes provided around said casing.

3. A fuel cell system according to claim 1, wherein said exhaust gas path is provided in a dual wall section provided around said casing.

4. A fuel cell system according to claim 1, wherein said exhaust gas path has an inlet of the exhaust gas at a position corresponding to the center of said fuel cell stack in the stacking direction.

5. A fuel cell system according to claim 1, wherein said heat retention chamber is symmetrical with respect to the central axis of said fuel cell stack, and symmetrical from the center to one end and the other end of said fuel cell stack in the stacking direction.

6. A fuel cell system according to claim 5, wherein a rectifier plate for guiding the exhaust gas to opposite ends of said fuel cell in the stacking direction is provided in said heat retention chamber.

7. A fuel cell system according to claim 6, wherein said rectifier plate is provided symmetrically from the center to one end and the other end of said fuel cell stack in the stacking direction.

8. A fuel cell system according to claim 1 wherein said fluid unit is symmetrical with respect to the central axis of said fuel cell stack.

9. A fuel cell system according to claim 1, wherein said casing contains a load applying mechanism at the other end of said fuel cell stack in the stacking direction for applying a tightening load to said fuel cell stack in the stacking direction.

10. A fuel cell system according to claim 9, wherein said load applying mechanism is symmetrical with respect to the central axis of said fuel cell stack.

11. A fuel cell system according to claim 1, wherein said fluid unit includes an evaporator for evaporating water to produce a mixed fluid containing the raw fuel and water vapor.

12. A fuel cell system according to claim 11, wherein said reformer is provided inside said heat exchanger, near said fuel cell stack; and
said reformer and said evaporator are adjacent to each other.

13. A fuel cell system according to claim 1, wherein said combustor is formed separately from said casing.

14. A fuel cell system according to claim 1, wherein said combustor is formed integrally with said casing.

* * * * *